INVENTOR.
GERALD T. KEAHL

United States Patent Office 3,435,209
Patented Mar. 25, 1969

3,435,209
TWO WAVELENGTH INFRARED ANALYZER HAVING A PAIR OF VARIABLE INTERFERENCE FILTERS FOR DETERMINING THE RESPECTIVE WAVELENGTHS
Gerald Thomas Keahl, Fullerton, Calif., assignor to Beckman Instruments, Inc., a corporation of California
Filed Mar. 10, 1966, Ser. No. 533,213
Int. Cl. G01n 21/26
U.S. Cl. 250—43.5                 4 Claims

ABSTRACT OF THE DISCLOSURE

There is disclosed a radiant energy analyzer in which radiation from a source is directed alternately along first and second radiant energy beam paths in which are located separate, independently operated wavelength selectors such that radiant energy of differing wavelengths may be selected in each beam path. The beams are recombined and focused onto a detector which is connected to an optical null servo loop. A sample cell, which may be a flow cell if desired, is placed in the common beam path between the source and the beam spreader.

---

This invention relates to radiant energy analyzers and more particularly to a dispersive radiant energy analyzer particularly adapted for the monitoring and/or control of process streams.

Although the principles described herein are applicable to all regions of the electromagnetic spectrum the infrared region offers advantages in the monitoring and/or control of process streams due to the specificity generally found in the infrared region of their absorption spectrum.

Most current instrumentation utilized in the monitoring and/or control of process streams is limited to the so-called nondispersive infrared analyzers using a selectively sensitized pneumatic detector. These analyzers are, in general, limited to use of gaseous streams since the selectivity of the pneumatic detector is due to the fact that it can be sensitized with the gas being monitored. Some work has been done with liquids and solids when a gas can be found which absorbs in the proper region and which does not absorb at wavelengths where other components in the stream to be analyzed may absorb. The non-dispersive infrared analyzers of the prior art are limited in specificity and sensitivity and, in addition, have the general limitation that extremely short path lengths are required in the analysis of liquid streams. Typical path lengths in such work have been of the order of 0.01 to 0.1 millimeter. Because of clogging, the maintenance of a continuously flowing sample through the sample cell is extremely difficult, particularly for streams having high viscosity and which may contain small particles of contaminants.

Figure 1:
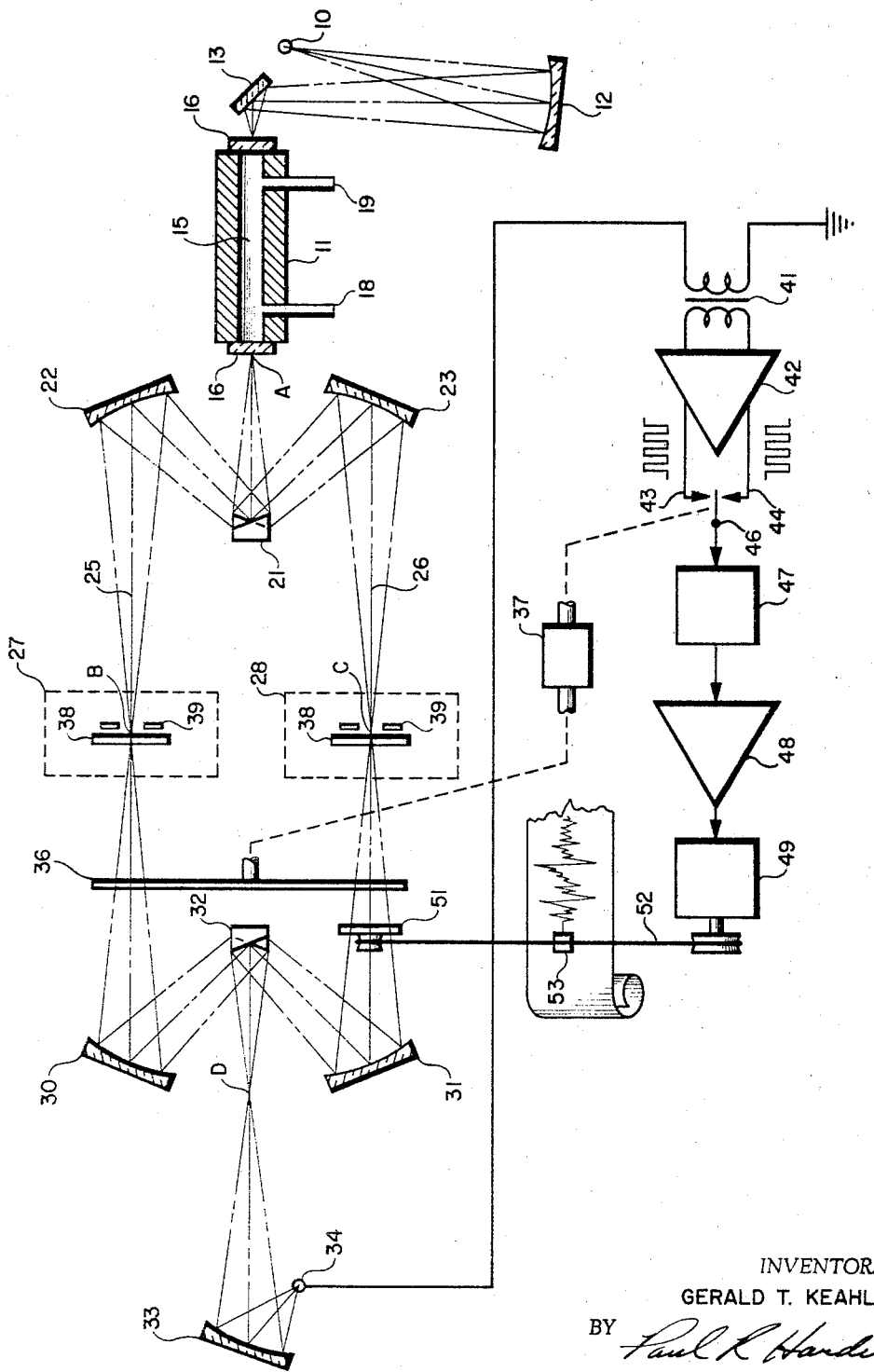
FIG. 1 illustrates a schematic diagram of a preferred embodiment of a radiant energy analyzer constructed according to the teachings of this invention.

Referring now to the drawings and more particularly to FIG. 1 thereof, radiant energy from source 10 is focused at the entrance of a sample cell 11 by focusing mirror 12 and flat mirror 13. Source 10 may be of any suitable type depending upon the wavelength region involved and if the analyzer is to operate in the infrared region may be a Nearnst Glower, Glo-Bar, Nechrome coil, or any other suitable source of infrared radiation which provides a continuum over a wide range of wavelengths.

The sample cell 11 has an optical path 15 passing therethrough and is sealed on each end by windows 16. Windows 16 are selected of any suitable material which transmits in the region of the radiant energy spectrum involved. Inlet and outlet tubes 18 and 19 are provided for passing the sample stream, or a portion thereof, through cell 11. The sample cell of FIG. 1 is particularly adapted for use in monitoring process streams of a gaseous nature. In practice, the optical path 15 may generally be of rectangular cross section selected to match the maximum slit opening of slits 39 described in greater detail hereinafter and may conveniently be of the so-called light-pipe type to maximize path length while minimizing the volume in order to maintain maximum optical efficiency. This provides for a maximum response of the system while providing a minimum time for sample exchange.

Radiation passing cell 11 is divided by beam splitter 21 and directed by fixed mirrors 22 and 23 along first and second beam paths 25 and 26 through first and second wavelength selectors 27 and 28. Radiation passing wavelength selectors 27 and 28 is directed respectively by fixed mirrors 30 and 31 to a beam recombiner 32. Radiant energy in the beam paths 25 and 26 is combined along a common path to fixed mirror 33 which focuses the radiation onto a radiant energy detector 34.

A beam chopper 36, which may be a blade of any opaque material such as steel, is driven by motor 37 at any suitable speed to alternately interrupt beams 25 and 26, thus providing a modulating function as is well known to those skilled in the art. Chopper 36 may be a semicircle or provided with any number of evenly spaced blade areas such as three blades of 60° segments separated by 60° open sectors. Thus, radiant energy passing the first and second beam paths 25 and 26 time share the common path between beam recombiner 32 and detector 34 and alternately impinge upon the detector at a frequency determined by the speed and type of chopper.

Beam splitter 21 and beam recombiner 32 each comprise a pair of prisms aluminized on the hypotenuse and used as first surface mirrors. Each of the prisms are identical and are utilized in place of standard type mirrors to eliminate machining of angles but it should be understood that any flat reflecting surface could be utilized in place of these prisms.

If mirrors 22 and 23 have an effective focal length $f_1$ and source 10 is focused by mirror 12 and the light-pipe effect of cell 11 at point A; and if point A is located a distance $2f_1$ from mirrors 22 and 23 with beam splitter 21 located at the midpoint or $f_1$, mirrors 22 and 23 will form, respectively at B and C images of source 10 at unity magnification. The distance from mirrors 22 and 23 to their respective image points B and C is equal to twice the effective focal length of the mirrors or $2f_1$. Since the prisms of beam splitter 21 are located at the focal length $f_1$ of mirrors 22 and 23, the images of the prism apertures formed thereby are collimated by mirrors 22 and 23 in the space between mirrors 22 and 23 and mirrors 30 and 31.

Mirrors 30 and 31 likewise have a common effective focal length $f_2$ and are located a distance $2f_2$ from images B and C. If beam recombiner 32 is located a distance $f_2$ from mirrors 30 and 31 source 10 will be reimaged at D, a distance $f_2$ from beam recombiner 32 at unity magnification. Because of the symmetry of the optical system on each side of images B and C, the image of beam splitter 21 is formed on beam recombiner 32. The images of the prism apertures of the beam splitter 21 on the conjugate prisms of beam recombiner 32 are at unity magnification.

If the prisms of beam splitter 21 and beam recombiner 32 are set one above the other in proper fashion, radiation from the upper prism of beam splitter 21 is transferred by mirrors 22 and 30 to the lower prism of beam recombiner 32. Likewise radiation from the lower prism of beam splitter 21 is transferred to the upper prism of beam recombiner 32. If $f_1$ is made equal to $f_2$ mirrors 22, 23, 30 and 31 may be made of identical construction.

The foregoing optical system has the advantage of transferring the image of source 10 at A to point D at unity magnification while providing the intermediate images B and C which may be utilized advantageously in connection with wavelength selectors 27 and 28. The system also transfers the prism apertures of beam splitter 21 at unity magnification to their conjugate prisms of beam recombiner 32. The balanced optical paths in both beams with a minimum number of reflections in each path and the location of intermediate images B and C provide for maximum energy transfer through the system with a minimum of stray or scattered radiation and, by virtue of the utilization of unity magnification image transfer on all focusing optics, other than mirror 33, optical tolerances in the positioning of optical elements are increased thereby eliminating critical focusing requirements.

Each of wavelength selectors 27 and 28 may conveniently comprise a variable interference filter 38 for wavelength selection. The variable interference filter is generally produced by a carefully designed stack of layers of alternate high and low refractive index material on a suitable substrate. The layers may be deposited by vacuum evaporation on a substrate material such, for example, as quartz, sapphire or germanium, depending upon the wavelength region involved. If there is no substantial difference in the refractive index or transmission characteristics of the layers, the difference in the physical characteristics of the filter coated for the transmission of a wavelength $\lambda$ and one coated for the transmission of a wavelength $2\lambda$ is that all layers or coatings in the stack are twice as thick. By applying the coatings to the substrate in such a manner that the thickness of each layer varies linearly along the substrate, the wavelength band transmitted by a small segment of the filter will also vary linearly along the filter. If the coatings are applied to a circular blank of substrate material in such a manner that the thickness of each layer varies linearly as a function of angle, a circular variable interference filter is provided and the wavelength band transmitted by the resultant filter will also vary linearly as a function of angle. By proper design, a narrow-band pass filter can be produced on one surface and the higher and lower orders of the transmitted wavelength can be eliminated by deposition on the opposite side of the substrate of a variable wide-band pass filter.

The wavelength selectors 27 and 28 may further include slits 39 positioned closely adjacent the filters 38 to define the band width of the energy passing the wavelength selecting elements. The slits 39 may be either fixed or variable and in the case of a circular variable interference filter may conveniently be pie-shaped sectors. If a circular variable interference filter having a wavelength that linearly changes as a function of angle is utilized, maximum resolution and energy transfer may be maintained by controlling the geometric slit width or physical separation of the slit jaws such that they correspond to the half intensity band width. Thus by rotating the circular variable interference filters 38 with respect to slits 39 any suitable wavelengths $\lambda_1$ and $\lambda_2$ may be selected. For a fuller understanding of the construction of the circular variable interference filter and of the variable slits reference is made to copending applications 451,859 and 451,950 each filed Apr. 29, 1965 and assigned to the assignee of the present invention.

It should be understood that other wavelength selection devices may be utilized in place of the variable interference filters illustrated in the preferred embodiment. When the wavelength selection device is of the interference filter type, the system is most advantageously arranged such that the narrow-band pass side of the substrate is located on the source side of the system and the intermediate image points B and C are located on the surface of the filter. If a wavelength selection device of the dispersive type is utilized, reimage points B and C would generally be located at the entrance slit. It should further be understood that it is not essential that the interference filter be of circular configuration. A linear interference filter may be utilized while maintaining all of the advantages of the present system.

As has been hereinbefore pointed out, as chopper 36 rotates to alternately interrupt the first and second beams 25 and 26 radiant energy pulses which have alternately passed wavelength selectors 27 and 28 are focused on detector 34. Detector 34 may be of any suitable type and provides an electrical output signal proportional to the instantaneous incident radiation. As is well known, the output of the detector 26 will have an A.C. component having an amplitude and phase that varies as a function of the difference in the energy in beam paths 25 and 26. The A.C. component may be coupled by transformer 41 to the input of amplifier 42 having a phase splitter as its output stage. Accordingly, an A.C. signal having an amplitude and phase that varies as a function of the difference in the energy in the two beam paths appears on output line 43 of amplifier 42 and a signal of like magnitude but of opposite phase appears on output line 44. The output of amplifier 42 is demodulated by demodulator 46 drive in synchronism with chopper 36 by motor 37 and is passed by filter 47 to provide a D.C. signal having an amplitude and polarity that varies as a function of the difference in energy in beam paths 25 and 26. The output of filter 47 is applied to servo amplifier 48 utilized to drive servo motor 49.

An optical attenuator 51 positioned in beam path 26 is coupled by servo 49 to drive cable 52. The output of amplifier 48 drives servo motor 49 in such a direction as to reduce the D.C. input signal to zero. As servo 49 rotates, the optical attenuator opens or closes, as the case may be, to balance the energy in beam 26 with that in beam 25 thus reducing the A.C. component of detector 34, and thus the D.C. input to servo amplifier 48, to zero. A pen 53, attached to drive cable 52, may be utilized to record the ratio of the intensity of beam 25 to the intensity of beam 26 on chart 54.

Figure 2:
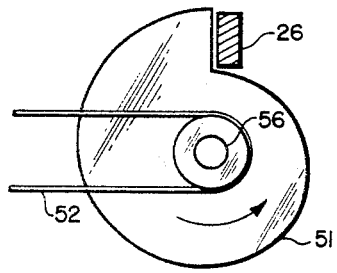
FIG. 2 illustrates an optical attenuator for use in the embodiment of FIG. 1.

Attenuator 51 is illustrated in greater detail in FIG. 2. Attenuator 51 may take the form of a solid blade having an outer edge in the form of a spiral. Attenuator 51 is rotated on shaft 56 by drive cable 52 in the direction of the arrow as the intensity of beam 25 decreases. As the attenuator rotates progressive portions of beam 26 are blocked by the spiral-shaped edge.

Figure 3:
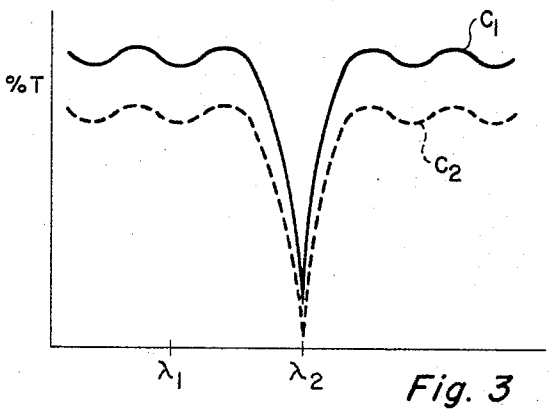
FIG. 3 illustrates the possible spectrum of a process stream being monitored.

Referring now to FIG. 3, there is illustrated the spectrum of a sample with percent transmittance plotted as a function of wavelength $\lambda$. The solid lines indicate the spectrum for a concentration $C_1$ and the dotted line indicates a spectrum for a concentration $C_2$. From Beer's law it is known that the concentration of a sample is equal to minus the log of the transmittance of the sample at a particular wavelength times a constant. Thus:

$$C = k_1(-\log T_1) = k_2(-\log T_2) \quad (1)$$

where $k_1$ and $k_2$ are constants, $T_1$ is the transmittance at first wavelength $\lambda_1$ and $T_2$ is the transmittance at a second wavelength $\lambda_2$. Thus:

$$k_1 \log T_1 - k_2 \log T_2 = 0 \quad (2)$$

Let $$R = T_1/T_2 \quad (3)$$

then $$\log T_1 - \log T_2 = \log R \quad (4)$$

Multiplying Equation 4 by $k_1$ and subtracting the resultant from Equation 2:

$$(k_1-k_2) \log T_2 = k_1 \log R \qquad (5)$$

or $$\log T_2 = -\frac{k_1}{k_1-k_2} \log R \qquad (6)$$

Substituting Equation 6 in Equation 1 gives $$C = \frac{k_1 k_2}{k_1-k_2} \log R = \frac{k_1 k_2}{k_1-k_2} \log \frac{T_1}{T_2} \qquad (7)$$

Since $k_1$ and $k_2$ are constants which may be determined for a particular sample at a given wavelength, Equation 7 shows that it is possible to determine the concentration of a sample by measuring the ratio of the transmittance of the sample at two wavelengths. This may be accomplished by setting selector 28 at a wavelength $\lambda_1$ and selector 27 at wavelength $\lambda_2$. Since sample transmittance is equal to the ratio of radiant energy transmitted by the sample I to the radiant energy incident thereon $I_0$, it may be seen that $$T_1 = I_1/I_0 \qquad (8)$$

where $I_1$ is the intensity of the radiation transmitted by the sample at $\lambda_1$ and $$T_2 = I_2/I_0 \qquad (9)$$

where $I_2$ is the energy transmitted by the sample at $\lambda_2$. Substituting Equations 8 and 9 in Equation 7 we have $$C = k \log \frac{I_1}{I_2} \qquad (10)$$

If selector 26 is set at $\lambda_1$ and selector 27 at $\lambda_2$ then the optical null system will operate to balance the intensity in beam path 26 with that in beam path 25. As is well known in the optical null system the attenuator or pen position is proportional to the ratio of the intensity in beam path 25 to that in beam path 26. Thus, the pen position P is $$P = I_1/I_2 \qquad (11)$$

It is readily apparent that by utilizing log paper and driving chart 54 as a function of time the concentration of the sample may be directly recorded and a process stream passing, or having a portion passing, the sample cell 11 may be monitored and if desired, appropriately controlled.

Figure 4:
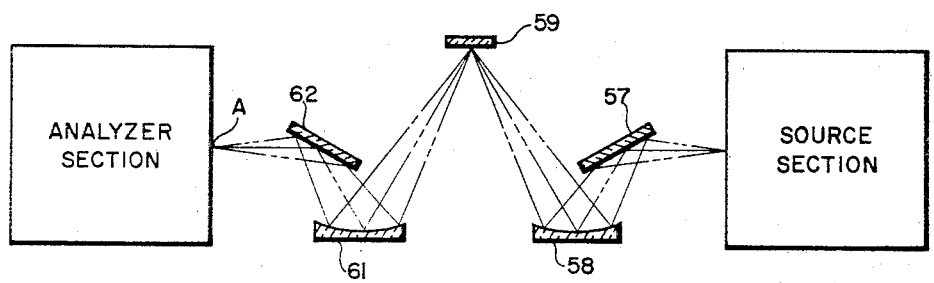
FIGS. 4 and 5 illustrate alternative embodiments of the analyzer of FIG. 1 which are particularly adapted to different types of samples.

Referring now to FIG. 4, there is illustrated a sampling technique for monitoring the reflectance of a sample. In this embodiment radiation from the source section is focused by mirrors 57 and 58 onto the surface of a sample 59. Radiation reflected from sample 59 is transferred to the beam splitter in the analyzer section by mirrors 61 and 62. By appropriate selection of the focal length and placement of the mirrors the source may be reimaged at point A in the analyzer section as was the case in the embodiment of FIG. 1. Sample 59 may be a sample whose composition is to be monitored directly or it may be desired to monitor the sample for contaminants on the surface. Sample 59 may be continuously moving past the beam in a continuous process stream. For example, one application of the sampling technique of FIG. 4 may be used in the monitoring of the thickness or composition of a coating applied to the surface of a sample. For example, the system of FIG. 4 may be utilized to monitor a film coating on a metallic material such as a thin plastic film on an aluminum surface. The aluminum would provide a good reflective base and the plastic coating thickness may be readily monitored.

Figure 5:
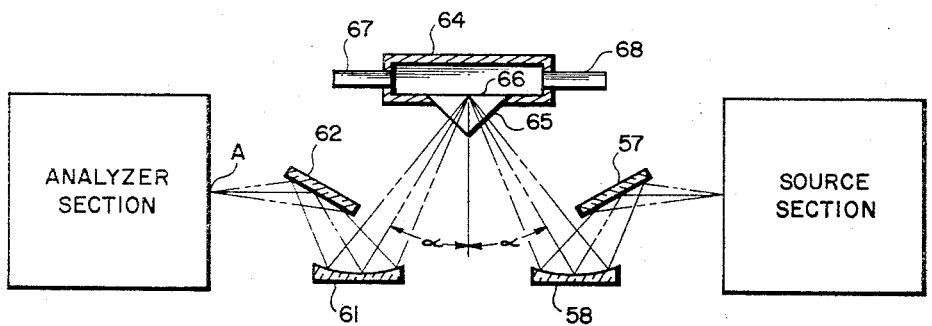

FIG. 5 is an arrangement similar to that of FIG. 4 except that the sample cell is particularly adapted for use with liquid samples. In this embodiment sample cell 64 is provided with a prism 65 having its hypotenuse 66 forming at least a portion of one wall of cell 64. Sample flow is provided through the cell by inlet and outlet tubes 67 and 68. If the angle $\alpha$ is carefully chosen as a function of the refractive index of the sample and prism, the beam, while totally reflected at the hypotenuse, will actually penetrate the sample slightly and produce the effect known as attenuated total reflectance. This technique has produced good spectra of liquids and other difficult samples to handle in laboratory instruments. The technique has the advantage of having large flow paths for the sample and yet short optical paths due to the slight penetration at the face of the prism which eliminates the difficulties in sampling discussed herebefore.

While the sampling section has been illustrated in the preferred embodiments as being between the source and the analyzer section it is apparent that sampling may take place after wavelength selection and before the detector. Since point A is reimaged at point B at unity magnification, if a point source is provided at A the sample may be monitored at point D to the same extent as has been disclosed.

It is apparent that the foregoing optical analyzer provides a system which is particularly adapted for the monitoring of process streams. Since all of the radiation passing beam paths 25 and 26 pass through a single sample chamber, if a sample chamber is utilized, the effects of sample temperature, particulate matter, window damage or clouding, etc., are totally compensated yielding a stable system free from sampling effects. The use of variable interference filters allows a simple two-wavelength analysis to be performed by merely selecting an appropriate wavelength in each path. Because of the sampling techniques involved many of the disadvantages of prior art non-dispersive infrared analyzers have been eliminated and the utilization of attenuated total reflectance sampling techniques greatly expand the potential uses of this system. It should further be understood that the output of detector 34 may provide an input to a ratio recording system such, for example, as that illustrated in U.S. Patent No. 2,761,350 issued September 4, 1956. Other indicating or recording schemes may be utilized and the output may be supplied to an appropriately calibrated meter although in most practical cases it will be most desirable to provide a permanent record of the output.

Obviously, many modifications and variations of the present invention are possible in light of the foregoing teachings. Therefore, it is to be understood that the foregoing describes only a preferred embodiment of the invention which may be practiced otherwise than as specifically described without departing from the spirit and scope of the invention as set forth in the appended claims.

What is claimed is:
1. A process radiant energy analyzer comprising:
   a source of radiation;
   a beam splitter interposed in a first common beam path from said source and directing radiation therefrom along first and second beam paths;
   first, second, third and fourth radiant energy reflecting means, said first and second reflecting means respectively positioned in said first and second paths and directing incident radiation to said third and fourth reflecting means while forming images of said source at unity magnification therebetween;
   first and second wavelength selection means respectively positioned in said first and second beam paths;
   a beam re-combiner positioned to receive radiation from said third and fourth reflecting means and directing said radiation along a second common beam path to a detector, the focal length of said reflecting means being selected such that said source is reimaged in said second common beam path at unity magnification;
   means for alternately interrupting the energy in said first and second beam paths;
   means for positioning a sample in one of said common beam paths; and means connected to said detector for measuring an optical characteristic of said sample.

2. A process radiant energy analyzer comprising:
a source of radiation;
a beam splitter interposed in a first common beam path from said source and directing radiation along first and second beam paths;
first, second, third and fourth radiant energy reflecting means, said first and second reflecting means respectively positioned in said first and second beam paths and directing incident radiation to said third and fourth reflecting means while forming images of said source at unity magnification therebetween;
first and second variable interference filter means respectively positioned in said first and second beam paths at substantially said intermediate image points;
a beam re-combiner positioned to receive radiation from said third and fourth reflecting means and directing said radiation along a second common beam path, the focal length of said reflecting means being selected such that said source is reimaged in said second common beam path at unity magnification;
means for positioning a sample in one of said common beam paths;
means for alternately interrupting the energy in said first and second beam paths; and
means connected to receive the output of said detector for measuring the ratio of the intensity of the radiation in said first and second beam paths.

3. A process radiant energy analyzer comprising:
a source of radiation;
beam splitter means interposed in a first common beam path from said source and directing radiation therefrom along first and second beam paths;
first and second variable interference filter means respectively positioned in said first and second beam paths;
a radiation detector providing an output signal proportional to the intensity of the radiation impinging thereon;
beam recombiner means positioned to receive radiation from said first and second beam paths and direct said radiation along a second common beam path to said detector;
means for alternately interrupting the energy in said first and second beam paths whereby a series of radiation pulses impinge on said detector, alternate pulses passing said first variable interference filter means and intermediate pulses passing said second variable interference filter means;
means for positioning a sample in one of said common beam paths; and
means responsive to the output of said detector for indicating an optical characteristic of said sample.

4. The process radiant energy analyzer of claim 3 wherein said means for positioning a sample in one of said common beam paths provides a continuous sample stream in said path.

References Cited

UNITED STATES PATENTS

| | | | |
|---|---|---|---|
| 3,091,690 | 5/1963 | McHenry | 250—43.5 |
| 3,194,962 | 7/1965 | Carlon et al. | 250—43.5 |
| 3,279,308 | 10/1966 | Bartz et al. | |

RALPH G. NILSON, *Primary Examiner.*

A. L. BIRCH, *Assistant Examiner.*

U.S. Cl. X.R.

88—14